United States Patent [19]

Fukaya et al.

[11] Patent Number: 5,099,432
[45] Date of Patent: Mar. 24, 1992

[54] METHOD FOR DETERMINING MACHINING PROCESS IN NUMERICAL CONTROL INFORMATION GENERATING FUNCTION

[75] Inventors: Yasushi Fukaya; Akira Hibi; Yuto Mizukami, all of Ooguchi, Japan

[73] Assignee: Kabushiki Kaisha Okuma Tekkosho, Aichi, Japan

[21] Appl. No.: 401,058

[22] Filed: Aug. 31, 1989

[30] Foreign Application Priority Data

Aug. 31, 1988 [JP] Japan ................. 63-217241

[51] Int. Cl.⁵ ............................................. G06F 15/46
[52] U.S. Cl. ............................ 364/474.25; 364/191; 318/568.1
[58] Field of Search ............ 364/474.27, 474.26, 364/474.25, 191; 318/568.1; 314/474.24

[56] References Cited

U.S. PATENT DOCUMENTS

| | | | |
|---|---|---|---|
| 4,547,854 | 10/1985 | Hashimoto et al. | 364/474.25 |
| 4,723,203 | 2/1988 | Kishi et al. | 364/474.25 |
| 4,739,488 | 4/1988 | Asakura | 364/474.27 |
| 4,750,105 | 6/1988 | Ohkawa et al. | 364/191 |
| 4,823,255 | 4/1989 | Tanaka et al. | 364/191 |
| 4,928,221 | 5/1990 | Belkhiter | 364/474.25 |

Primary Examiner—Jerry Smith
Assistant Examiner—Patrick D. Muir
Attorney, Agent, or Firm—Wenderoth, Lind & Ponack

[57] ABSTRACT

A machining method is for determining numerical control information in a numerical control machine tool apparatus. A method includes inputting workpiece data denoting an initial shape of a workpiece which is to be machined, and further inputting product data denoting a desired final shape of the workpiece after it has been machined. Then, a machining area of the workpiece based on the workpiece data and the product data is determined. The thus determined machining area is divided into plural machining locations, and the numerical control information is prepared based on the plural machining locations. The workpiece is then machined based on the thus prepared numerical control information.

9 Claims, 10 Drawing Sheets

```
** PROCESS DESIGNATION **
    (PROCESS TYPE)

TYPE  NO. =

PROCESS TYPE ( 1. ROUGH MACHINING  2. PROFILING
              3. FINISHING  4. GROOVE  5. SCREW ---- )
```

FIG. 1A PRIOR ART

```
** PROCESS DESIGNATION **
   (MACHINING LOCATION,
    CUTTING DIRECTION )

NO. 1 = ROUGH MACHINING

DIRECTION NO. =

CUTTING DIRECTION ( 1 = OUTWARD —, 2 = INWARD —, ---- )
```

FIG. 1B PRIOR ART

```
** PROCESS DESIGNATION **
    (TOOL DESIGNATION)
                              ** TOOL DATA TABLE **
NO.1 = A ROUGH MACHINING —     NO.  CLASSIFICATION
TOOL DATA NO. =                 2   ROUGH MACHINING
                                         OUTWARD—
                               26   ROUGH MACHINING
                                         OUTWARD—

WHAT IS TOOL DATA NO. ?
```

FIG. 1C  PRIOR ART

```
** PROCESS DESIGNATION **
    (TOOL DESIGNATION)
NO.1 = ROUGH MACHINING OUTWARD —

INSTRUCTION DATA    TOOL NUMBER      TN =

SHAPE DATA          TOOL ANGLE       A1 =
                    CUTTER ANGLE     A2 =

TOOL ROTATING       ROTATING POSITION XT =
      POSITION                        ZT =
```

FIG. 1D  PRIOR ART

```
** PROCESS DESIGNATION **
    (CUTTING CONDITION)
NO. 1 = A ROUGH MACHINING OUTWARD
CUTTING SPEED   VR =
   FEED         FR =
   INFEED        D =
    ⋮
```

FIG. 1E PRIOR ART

```
** PROCESS DESIGNATION **
    (SHAPE DEFINITION)
NO. 1 = ROUGH MACHINING OUTWARD
   REFERENCE  X =
              Z =
```

FIG. 1F PRIOR ART

```
* * PROCESS DESIGNATION * *
      (SHAPE DEFINITION)

FIGURE ELEMENT      ＼
SURFACE ROUGHNESS   SR =
FINISHING POINT     X =
                    Z =
```

END SURFACE/LONGITUDINAL DIVISION PARAMETERS $\theta p = 10.000$ — CURSOR
$\ell p = 20.000$ $Wp = 20.000$ END SURFACE/LONGITUDINAL DIVISION ANGLE $\theta p$ ?
=

| TYPE OF MACHINING PROCESS | MACHINING LOCATION | FIGURE ELEMENT LINE | CUTTING DIRECTION | CUTTING TOOL NO. | CUTTING CONDITION ||| MACHINING SEQUENCE NO. |
|---|---|---|---|---|---|---|---|---|
| | | | | | SPINDLE REVOLUTION | FEED SPEED | INFEED | |
| ROUGH MACHINING | OUTER DIAMETER END FACE | ℓ6 | ← | 1 | 500 | 0.5 | 6.0 | 1 |
| ROUGH MACHINING | OUTER DIAMETER LONGITUDE | ℓ7 ℓ8 ℓ9 ℓ10 | ← | 1 | 300 | 0.6 | 8.0 | 2 |
| FINISHING MACHINING | OUTER DIAMETER LONGITUDE | ℓ7 ℓ8 ℓ9 ℓ10 | ← | 3 | 400 | 0.3 | / | 5 |
| ROUGH MACHINING | INNER DIAMETER END FACE | ℓ4 ℓ5 | ← | 2 | 400 | 0.3 | 1.5 | 3 |
| FINISHING MACHINING | INNER DIAMETER END FACE | ℓ4 | ← | 4 | 500 | 0.2 | / | 6 |
| ROUGH MACHINING | INNER DIAMETER LONGITUDE | ℓ3 ℓ2 | ← | 2 | 400 | 0.6 | 8.0 | 4 |
| FINISHING MACHINING | INNER DIAMETER LONGITUDE | ℓ3 ℓ2 | ← | 4 | 500 | 0.2 | / | 7 |

FIG. 8

METHOD FOR DETERMINING MACHINING PROCESS IN NUMERICAL CONTROL INFORMATION GENERATING FUNCTION

BACKGROUND OF THE INVENTION

The present invention relates to a determination method for machining process in numerical control information generating function when a material is to be machine-processed by a numerical control machine tool.

There has popularly been used what is generally known as a numerical control (NC) machine tool system which can automatically control machine tools using numerical information of numerals and codes to achieve automation of the machining process, realization of highly precise and complicated machining, and reduction of the machining cost and time.

The numerical control machine tool systems require that the numerical control data be inputted prior to the machining process. Recent numerical control machine tool systems functionally equipped to prepare numerical control information so as to input data in an interactive man-machine mode for facilitating the process. With this function capability, the numerical control information necessary to machine a given shaped work material to a given shaped product may easily be prepared by inputting the types and shapes of the materials and the machining process.

FIGS. 1A to 1G are explanatory views for respectively describing the determination method for the machining process in the prior art numerical control information generating function, while FIG. 2 is a view for showing an example of the shapes of a work material and of a product part.

Referring to FIGS. 1A to 1G and FIG. 2, the prior art method will be explained. As shown in FIG. 1A, a display appears on a screen to establish the type of a machining process. More particularly, a response is solicited on the display to input the types of machining necessary, such as rough machining, finishing machining, groove, screw or the like. In response, an operator designates the type of the machining process according to a number. When the machining the process type has been inputted, as shown in FIG. 1B, the display screen is switched to a display for indicating the machining location and the cutting direction. More particularly, a response is solicited on the display as to the location of the machining part or the cutting direction. In response the operator designates the location of the machining part and cutting direction in the process. For instance, the operator inputs a numeral "1" when the direction "outward←" is to be designated. When the inputs for the machining location and the cutting direction have been completed, as shown in FIG. 1C, a question is presented on the display as to the type of cutting tools to be used, and the operator designates the number of the appropriate tool data. Then, as shown in FIG. 1D, the display of the display screen is switched for determining the shape of the tool or the like. The operator inputs the appropriate numeral to designate the shapes and the rotating position of the tool and so on. When the inputs for determining the cutting tool have been completed, as shown in FIG. 1E, the display of the display screen is switched to establish the cutting conditions. Responding to the displayed questions, the operator inputs the cutting speed, feed speed, depth of the cut or the like in terms of numerals.

When the inputs for determining cutting conditions have been completed, as shown in FIG. 1F, the display is switched to define the machining shape. Responding to the display, the operator inputs a cycle reference point. Then, the screen display is switched to that shown in FIG. 1G where the operator inputs a figure element ⌐, a surface roughness, and the coordinates of the finishing point, etc. For example, as shown in FIG. 2, when figure element lines $l_7$, $l_8$, $l_9$ and $l_{10}$ are to be inputted, a starting point of the figure element line or the starting point $P_6$ of the figure element $l_7$ is first inputted in terms of the coordinates as the starting point of the shape, followed by the inputs of the figure element ⌐, the surface roughness and the coordinates of the finishing point and so on. When inputs are completed for the element $l_7$, similar inputs are provided for other figure element $l_8$, $l_9$ and $l_{10}$ in order to secure the shape. When a material shape, which has already been inputted, is to be machined into a shape of a product part, the above mentioned inputs for the process are repeated until the desired shape of the product part is obtained. The above method is for determining the machining process in the conventional numerical control information generation function.

In the aforementioned prior art numerical control information generating function, a machining process cannot be determined unless a series of designation process is repeated for each of the processes, such as rough machining, finishing, groove, screw, etc., so as to obtain a product part shape from the inputted material shapes. Therefore, the prior art method of inputting the data for generation of the numerical control information not only requires enormous time and labor, but is also too difficult for users having little knowledge of the machining process to fully utilized because the input method is overly complicated.

SUMMARY OF THE INVENTION

The present invention was conceived to eliminate aforementioned problems encountered in the prior art and aims at providing a method for determining a machining process in the numerical control information generating function which can reduce the time and labor expended in inputting data for numerical control information generation and which can be easily used by operators, even by such operators having little knowledge about the machining process.

According to one aspect of the present invention, for achieving the objects described above, there is provided a method for determining a machining process in a function of numerical control information generation when a material is machined using a numerical control machine tool, and the objects described above are achieved by that shapes of material to be machined and shapes of product parts are inputted, a machining zone is determined based on said shapes, the machining zone is divided into one or more machining locations, and the machining process is determined based on each of the divided machining locations.

The nature, principle and utility of the invention will become more apparent from the following detailed description when read in conjunction with the accompanying drawings.

BRIEF DESCRIPTION OF THE DRAWINGS

In the accompanying drawings:

FIGS. 1A through 1G are explanatory views for determining a machining process in the conventional numerical control information generating function;

FIG. 8 is a chart showing a machining process table of the embodiment.

PREFERRED EMBODIMENT OF THE INVENTION

In the numerical control information generating function according to the present invention, the shape of a material which is to be machined and a shape of the resultant product part are first inputted. Based on these inputted information, a machining zone is determined and this zone is divided into one or more machining locations. Then the type of machining process, cutting direction, cutting tool, cutting conditions and machining sequence are determined for each of the sub-divided machining locations. According to the present invention method, since the shape of the material which is to be machined and the product part shape are inputted, and a machining process is determined based such inputted information, the time and labor expended for data input can be reduced. The method of the present invention allows unskilled operators to easily perform the data input tasks even if they don't posses much knowledge of the machining process.

The present invention will now be described referring to the preferred embodiments.

Figure 3:
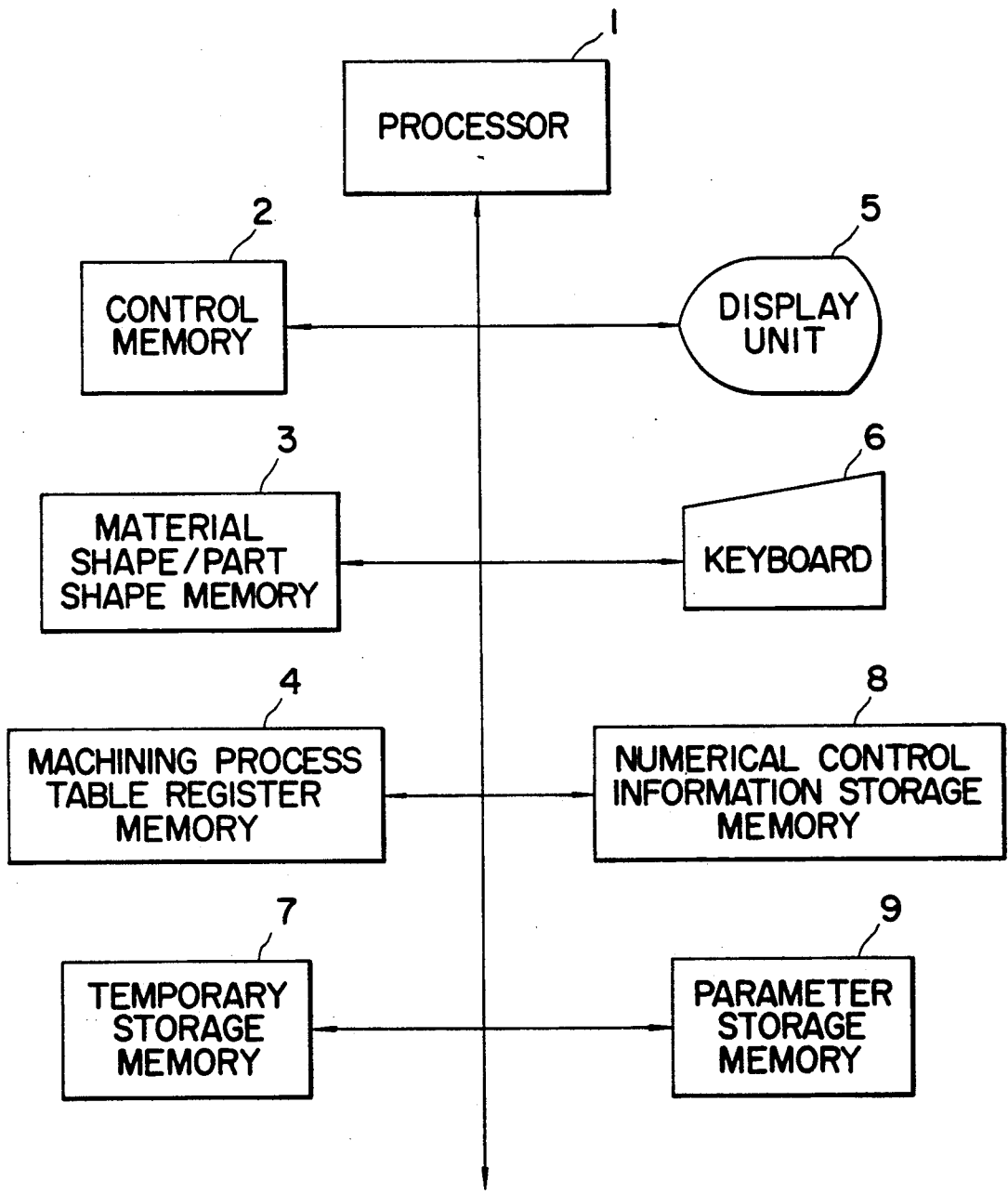
FIG. 3 is a block diagram showing an embodiment of the method for determining a machining process in numerical control information generation according to the present invention.

FIG. 3 is a block diagram of an embodiment to realize the method of the present invention for determining a machining process in numerical control information generation.

As shown in FIG. 3, the system embodying the present invention comprises a processor 1 which controls the entire system, a control memory 2 which stores a program for controlling the system, a material shape/part shape memory 3 which stores the data for the material shapes and the product part shapes, a machining process table register memory 4 which stores the information on the machining process, a display unit 5 which displays the process sequence information, a keyboard 6 from which the information on the material shape and the part shape is inputted, a temporary storage memory 7 which stores information such as figure elements temporarily, a numerical control information storage memory 8 which stores the information for the numerical control, and a parameter storage memory 9 which stores parameters for selecting a machining process.

The above component units can exchange information with each other.

Figure 1G:
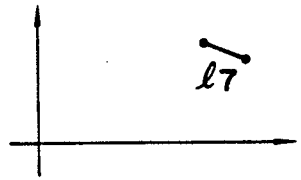
Figure 7:
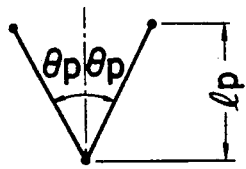
FIG. 7 is an explanatory view specifically showing the input method of the parameters for judging an end face machining location and a longitudinal machining location.
Figure 7:
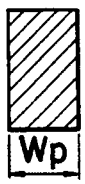
Figure 2:
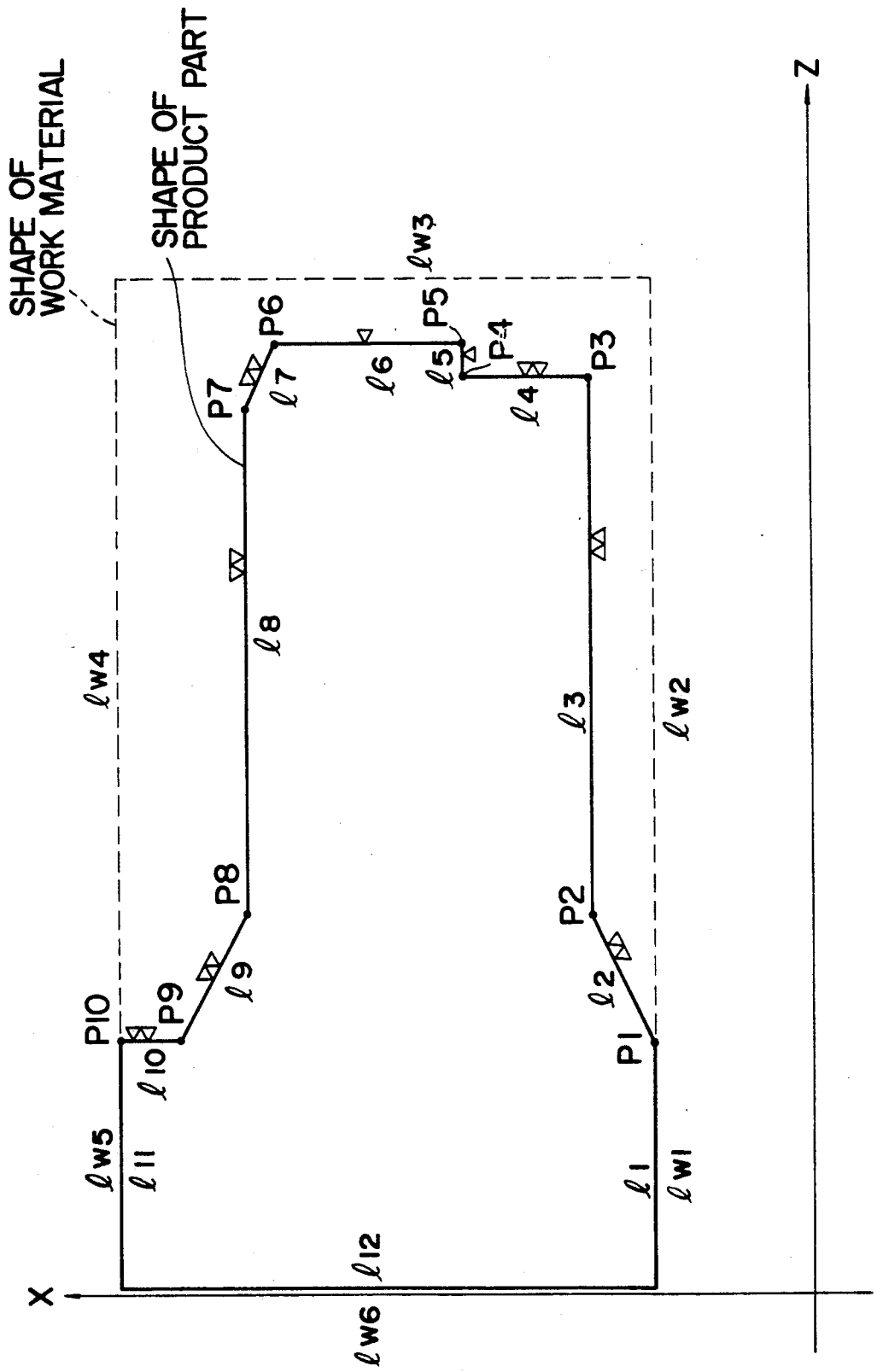
FIG. 2 is a plan view showing an embodiment of the material shape and the location shape.
Figure 4:
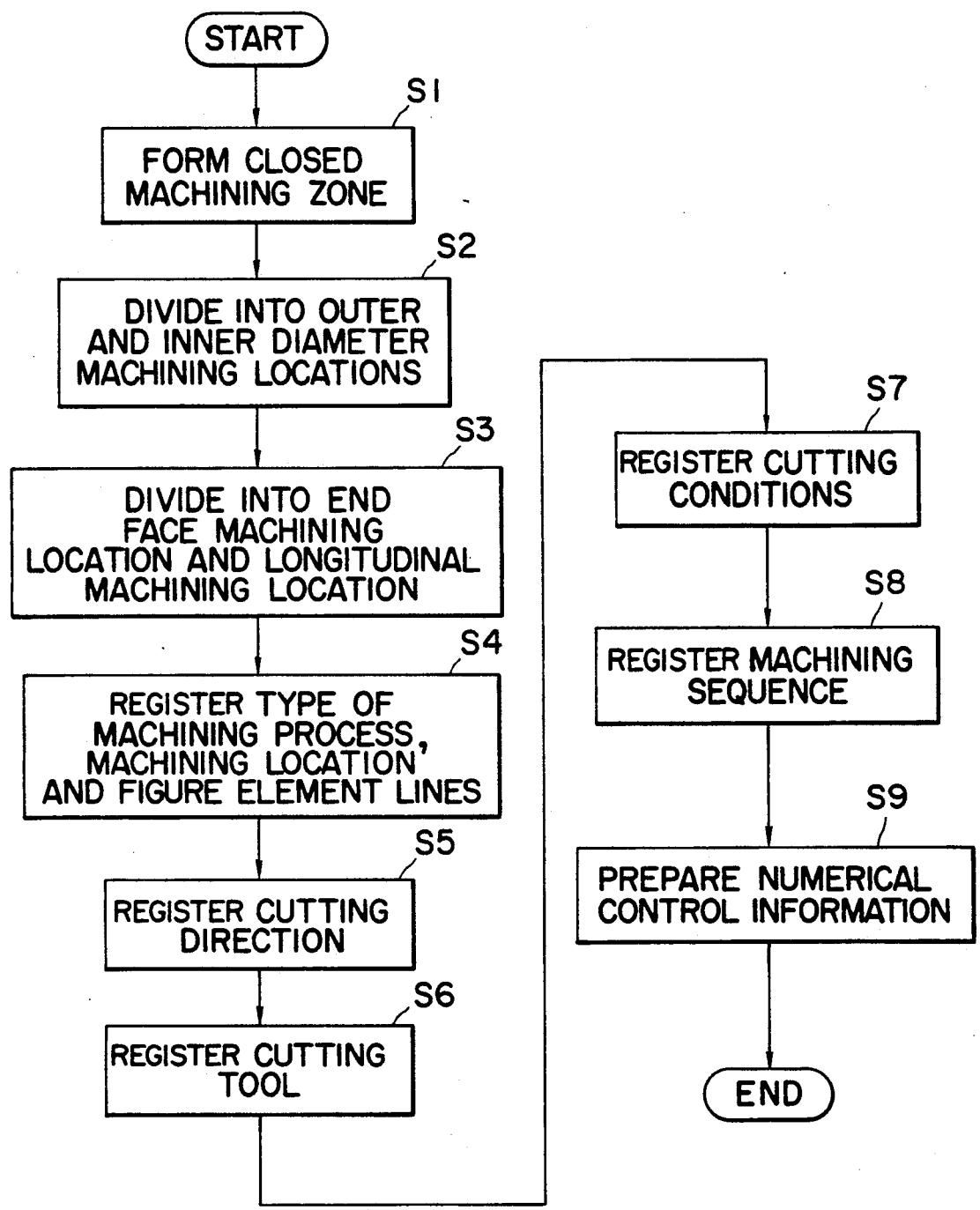
FIG. 4 is a flow chart for explaining the sequence of the operation in the numerical control information generation of the present invention.
Figure 5:
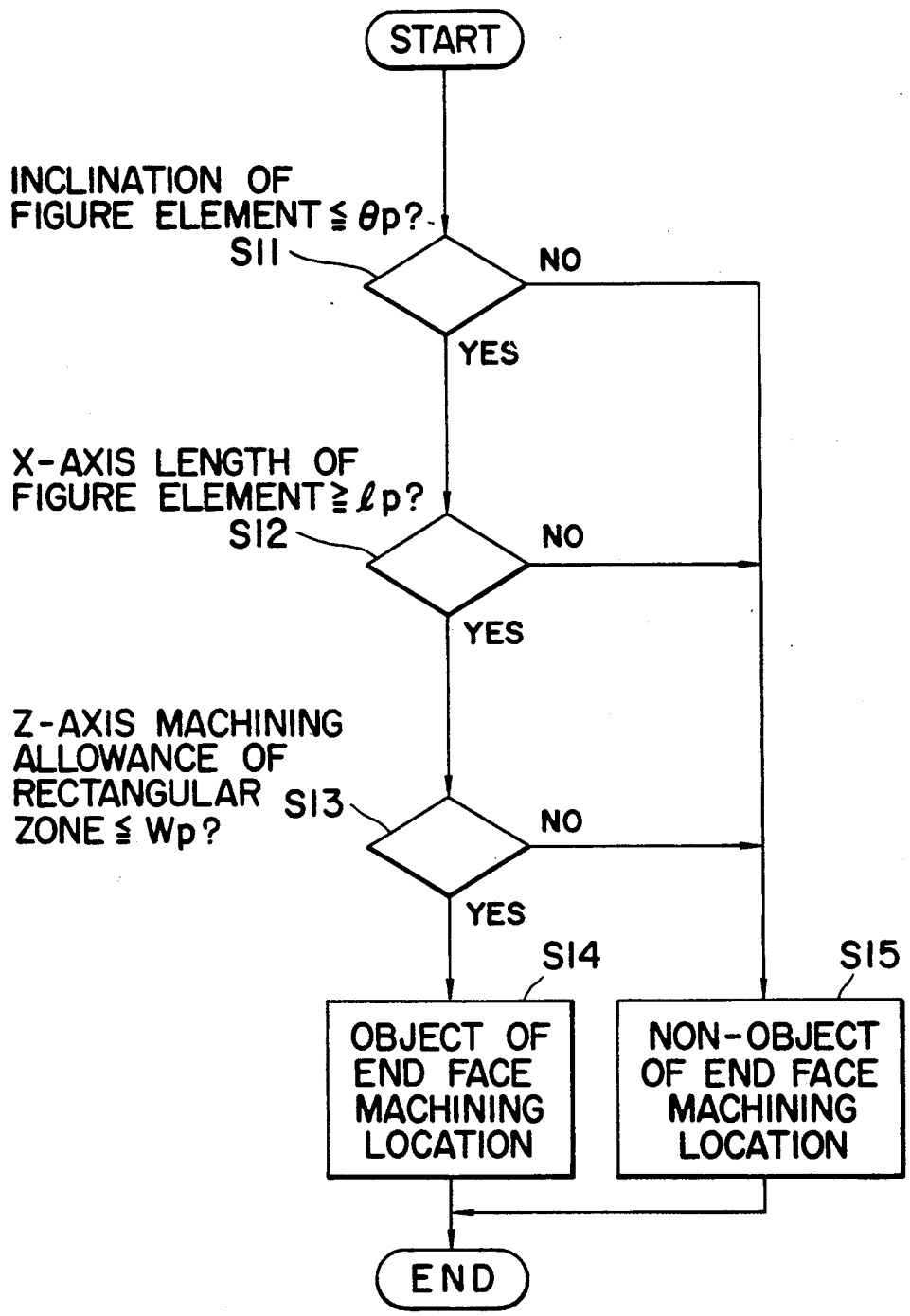
FIG. 5 is a flow chart for describing the sequence of the operation for recognizing an end face machining location.
Figure 6A:
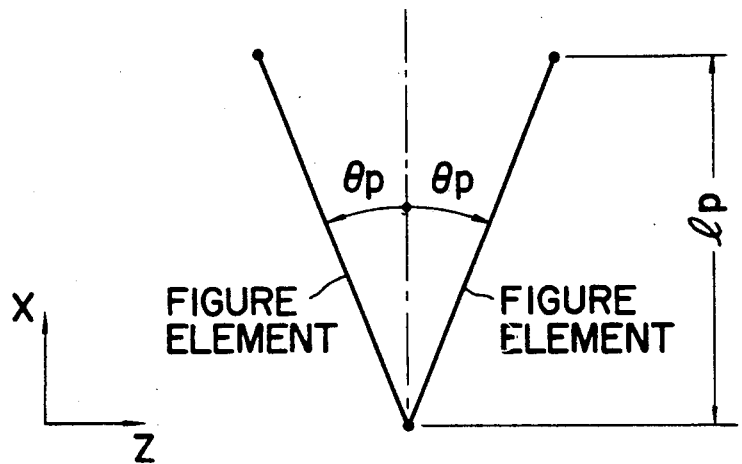
FIGS. 6A and 6B are explanatory charts for determining the parameters in differentiating an end face machining location from a longitudinal machining location, respectively.
Figure 6B:
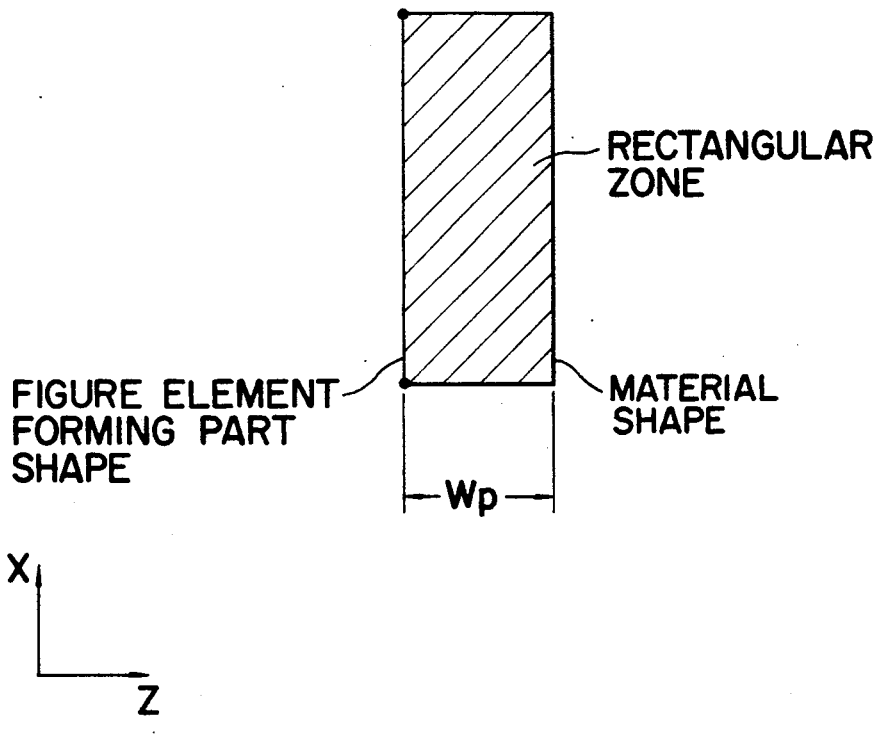

FIG. 4 is a flow chart showing the sequence of operations in the machining process method according to the present invention. FIG. 5 is a flow chart showing the sequence of the operations for judging an end face machining location. FIGS. 6A and 6B are explanatory charts showing parameters for judging an end face location and a longitudinal machining location. FIG. 7 is an explanatory view showing a specific input method for the parameters when the end face location and the longitudinal machining location are judged, and FIG. 8 is a chart showing a machining process table for the examples.

An embodiment will now be described in more detail referring to FIGS. 3 through 8 and FIG. 2.

Information on the material shape and the product part shape which have been inputted through the display unit 5 and the keyboard 6 in advance is stored in the material shape/part shape memory 3. For facilitating the description, it is assumed that the material shape/part shape memory 3 stores the information on the material shape and the product part shape such as shown that shown in FIG. 2.

The processor 1 reads out from the material shape/part shape memory 3 figure element line $L_w$ ($l_{w1}$, $l_{w2}$, $l_{w3}$, $l_{w4}$, $l_{w5}$, $l_{w6}$) which forms a material shape, and figure element line $L_p$ ($l_1$, $l_2$, $l_3$, $l_4$, $l_5$, $l_6$, $l_7$, $l_8$, $l_9$, $l_{10}$, $l_{11}$, $l_{12}$) which forms a product part shape, produces a figure element line $L_a$ ($l_2$, $l_3$, $l_4$, $l_5$, $l_6$, $l_7$, $l_8$, $l_9$, $l_{10}$, $l_{w4}$, $l_{w3}$, $l_{w2}$) which forms a closed machining zone, and stores them in the temporary storage memory 7 (Step S1). Next, the processor 1 reads out the figure element line $L_a$ produced in the Step S1 from the temporary storage memory 7, reads out the figure element line $L_p$ from the material shape/part shape memory 3, and produces the figure element line $L_c$ ($l_2$, $l_3$, $l_4$, $l_5$, $l_6$, $l_7$, $l_8$, $l_9$, $l_{10}$) which requires machining out of the figure element lines forming the part shape based on the figure element lines $L_a$ and $L_p$. The processor 1 divides the figure element line $L_c$ into a figure element line $L_o$ ($l_6$, $l_7$, $l_8$, $l_9$, $l_{10}$) which forms an outer diameter machining location and a figure element line $L_i$ ($l_5$, $l_4$, $l_3$, $l_2$) which forms an inner diameter machining location, and stores them in the temporary storage memory 7 (Step S2).

The division method will be described below. Out of a set ($P_1$, $P_2$, $P_3$, $P_4$, $P_5$, $P_6$, $P_7$, $P_8$, $P_9$, $P_{10}$) of starting/finishing points of each of the figure elements forming the figure element line $L_c$ which requires machining, a set ($P_5$, $P_6$) of the starting/finishing points which have the maximum values in the coordinates with respect to Z-axis is formed, and a point for dividing the inner diameter/outer diameter is determined as the starting/finishing point $P_5$ which has the minimum coordinates with respect to X-axis. Then, the figure element line $L_c$ is divided by the starting/finishing point $P_5$ into the figure element line $L_o$ forming the outer diameter machining location and into the figure element line $L_i$ forming the inner diameter machining location.

The processor 1 reads out the figure element line $L_o$ which was obtained at the Step S2 from the temporary storage memory 7, divides the figure element line $L_o$ into the figure element line $L_{of}$ ($l_6$) forming an end face machining location and a figure element line $L_{ol}$ ($l_7$, $l_8$, $l_9$, $l_{10}$) forming the longitudinal machining location, and stores them in the temporary storage memory 7. The processor 1 similarly divides the figure element line $L_i$ into the figure element line $L_{if}$ ($l_5$, $l_4$) forming the end face machining location on the inner diameter and the longitudinal machining location $L_{i1}$ ($l_3$, $l_2$) and stores them in the temporary storage memory 7 (Step S3).

Referring now to FIG. 5 and FIGS. 6A and 6B, each of the figure elements on the figure element lines $L_o$ and $L_i$ is judged to see if it satisfies the feature of the figure element which have been inputted by an operator as the subjects of the end face machining locations. The input method by the operator will be described hereinafter.

The processor 1 judges a selected figure element by evaluating the inclination relative the X-axis to see if it falls within the parameter $\theta_p$ which is inputted in advance by the operator and stored in the parameter storage memory 9 (Step S11). As shown in FIG. 6A, the parameter $\theta_p$ indicates a certain constant angle with respect to the axis X. At the Step S11, if the figure element is not within the parameter $\theta_p$, the process proceeds to Step S15 since the figure element is judged not an object of the end face machining location. If the inclination of the figure element is judged to be within the parameter $\theta_p$ at the above Step S11, then the length of the figure element with respect to the X-axis is judged to see whether or not such length it is longer than the parameter $l_p$ which is inputted in advance by the operator and stored in the parameter storage memory 9 (Step S12). As shown in FIG. 6A, the parameter $l_p$ indicates a certain constant length in the direction of the X-axis.

At the Step S12, if the length is judged to be not more than the parameter $l_p$, the process proceeds to the Step S15, and the figure element is judged as not being an object of the end face machining location. If the length is judged to be more than the parameter $l_p$ at the Step S12, on the other hand, a rectangular zone is formed using the figure elements and the material shape, the machining allowance in the direction (longitudinal direction) of the Z-axis is judged to see whether or not it is longer than the parameter $W_p$ which was inputted in advance by the operator and stored in the parameter storage memory 9 (Step S13). As shown in FIG. 6B, the parameter $W_p$ indicates a certain constant length in the direction of the Z-axis. If the machining allowance is judged to be not smaller than the parameter $W_p$ at the Step S13, the process proceeds to the Step S15 and the figure element is judged as not being an object of the end face machining location. If the machining allowance is judged to be smaller than the parameter $W_p$ at the Step S13, on the other hand, the figure element is judged to be an object of the end face machining location (Step S14).

Similar procedures are performed for all the figure elements of the figure element $L_o$, and the figure elements are divided into the figure element line $L_{of}$ forming an end face machining location on the outer diameter and the figure element line $L_{ol}$ forming a longitudinal machining location. Similar procedures are performed on the figure element lines $L_i$ forming the end face machining locations on the inner diameter, and the figure elements are divided into the figure element line $L_{if}$ forming an end face machining location on the inner diameter and a figure element line $L_{il}$ forming a longitudinal location.

The foregoing describes the sequence of operations for differentiating the end face machining location from the longitudinal machining location. On completion of the dividing process, the processor 1 sequentially reads out figure element lines $L_{of}$, $L_{ol}$, $L_{if}$, $L_{il}$ which were stored in the temporary storage memory 7, and reads out the surface roughness added to the figure elements which form the product part shapes stored in the material shape/part shape memory 3. The processor 1 also registers the type of machining process, the machining location and the figure element lines forming the machining location based on the surface roughness at the machining process table register memory 4 (Step S4). Since the surface roughness of the figure element $l_6$ is $\nabla$, the processor 1 needs only the rough machining in the figure element line $L_{of}$ forming the outer diameter end face machining location, and the process is registered in the machining process table register memory 4 as shown in FIG. 7. In the figure element line $L_{ol}$ forming the outer diameter longitudinal machining location, on the other hand, since all the surface roughness in the figure elements are $\nabla\nabla$ the processor 1 requires both the rough machining and finish machining. The process is thus registered in the machining process table register memory 4 as shown in FIG. 8.

In the figure element line $L_{if}$ forming the inner end face machining location, the surface roughness of the figure element $l_5$ is $\nabla$ and that of the figure element $l_4$ is $\nabla\nabla$. Therefore, the figure element $l_5$ is only roughly machined while the figure element $l_4$ is roughly machined and then finished. The process is registered in the machining process table register memory 4 as shown in FIG. 8. Since the figure element line $L_{il}$ forming the inner diameter longitudinal machining location is $\nabla$ and the figure elements $l_3$ and $l_2$ are $\nabla\nabla$ in the surface roughness, the rough machining and the finish machining may be performed. Therefore, the process is registered in the machining process table register memory 4 as shown in FIG. 8.

The processor 1 then registers the direction of the cutting in the machining process table register memory 4 based on the machining location (Step S5). The processor 1 also registers the cutting tools based on the process type, the machining location and the cutting direction in the machining process table register memory 4 (Step S6). Moreover, the processor 1 registers the cutting conditions based on the type of the machining process and the machining location (Step S7). The processor 1 registers further the machining sequence based on the type of the machining process and the machining location in the machining process table register memory 4 (Step S8). By the operations from the Step S4 through Step S8, information such as shown in FIG. 7 is registered as a machining process table in the machining process table register memory 4. Numerical control information is prepared in accordance with the machining process table registered in the machining process table register memory 4 and is stored in the numerical control information storage memory 8 (Step S9).

The method for determining the machining process according to the present invention is described in the foregoing. A description will be given as to the input method of the parameters $\theta_p$, $l_p$ and $W_p$ for dividing the figure elements into an end face machining location and a longitudinal machining location which are described above in relation to FIGS. 3 and 7.

The processor 1 first displays a screen as shown in FIG. 7 at the display unit 5. The operator moves a cursor on the screen in either one of the columns of the parameters $\theta_p$, $l_p$, and $W_p$ by pressing the cursor key on the keyboard 6, and inputs a desired numeral by pressing a number key.

When the numeral is inputted by the operator, the processor 1 stores the inputted numeral in the parameter storage memory 9. The stored parameters $\theta_p$, $l_p$, $W_p$ are to be used for dividing the machining locations into two types; i.e. the end face machining location and the longitudinal machining location.

As is described in the foregoing statement, the method of the present invention can reduce data input time and labor and allows an unskilled operator to easily perform data input even if such an operator does not known much about the machining process, since the present invention method inputs the shapes of the material and the part material. Based on these inputs, the machining process is determined. The present invention is therefore highly effective in practice.

It should be understood that many modifications and adaptations of the invention will become apparent to those skilled in the art and it is intended to encompass such obvious modifications and changes in the scope of the claims appended hereto.

What is claimed is:

1. A machining method for determining numerical control information in a numerical control machine tool apparatus, said method comprising:
    inputting workpiece data denoting an initial shape of a workpiece which is to be machined;
    inputting product data denoting a desired final shape of the workpiece after it has been machined;
    determining a machining area of the workpiece based on the workpiece data and the product data;
    dividing the machining area of the workpiece into plural machining locations;
    preparing the numerical control information based on the plural machining locations; and,
    machining a workpiece based on the numerical control information;
    wherein said machining area is divided into an inner diameter machining location and an outer diameter machining location, and each of the thus divided locations is further divided into a longitudinal machining location and an end face machining location.

2. A method as claimed in claim 1, wherein registered data including surface roughness data is inputted together with the product data, and based on the inputted surface roughness data, the machining locations which require both a rough machining process and a finishing machining process are differentiated from the machining locations which require only the rough machining process.

3. A method as claimed in claim 2, which includes a step of registering machining process data, machining locations and figure element lines in accordance with said surface roughness data.

4. A method as claimed in claim 3, which further includes a step of registering cutting direction data in accordance with the machining locations.

5. A method as claimed in claim 4, which includes a step of registering cutting tool data in accordance with the machining process data, machining locations and cutting direction.

6. A method as claimed in claim 5, which includes a step of registering cutting condition data and machining sequence data in accordance with the machining process data and machining locations.

7. A method as claimed in claim 6, which includes a step of preparing the numerical control information in accordance with the registered data.

8. A method as claimed in claim 1, wherein one of plural starting/finishing points of plural figure elements which define a shape of each of the machining locations is determined as a dividing point based on coordinates of the starting/finishing points, and wherein the machining area is divided into the inner diameter machining location and the outer diameter machining location by using the thus determined dividing point as a boundary point.

9. A method as claimed in claim 1, wherein registered data is inputted together with the product data,
    a step of registering machining process data, machining locations and figure element lines in accordance with inputted surface roughness data;
    a step of registering cutting direction data in accordance with the machining locations;
    a step of registering cutting tool data in accordance with the machining process data, machining locations and cutting direction;
    a step of registering cutting condition data and machining sequence data in accordance with the machining process data and machining locations; and,
    a step of preparing the numerical control information in accordance with the registered data.

* * * * *